US010443475B2

(12) United States Patent
Lipa (10) Patent No.: US 10,443,475 B2
(45) Date of Patent: Oct. 15, 2019

(54) SECONDARY AIR SYSTEM IN AN EXHAUST GAS PURIFICATION SYSTEM OF AN INTERNAL COMBUSTION ENGINE (71) Applicant: Continental Automotive GmbH, Hannover (DE)

(72) Inventor: Jaroslav Lipa, Cheb (CZ)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 124 days.

(21) Appl. No.: 15/518,052

(22) PCT Filed: Sep. 16, 2015

(86) PCT No.: PCT/EP2015/071230
§ 371 (c)(1),
(2) Date: Apr. 10, 2017

(87) PCT Pub. No.: WO2016/058775
PCT Pub. Date: Apr. 21, 2016

(65) Prior Publication Data
US 2017/0314442 A1    Nov. 2, 2017

(30) Foreign Application Priority Data
Oct. 14, 2014 (DE) .................. 10 2014 220 815

(51) Int. Cl.
*F01N 3/22* (2006.01)
*F01N 3/10* (2006.01)
(Continued)

(52) U.S. Cl.
CPC ............ *F01N 3/225* (2013.01); *F01N 3/101* (2013.01); *F01N 3/18* (2013.01); *F01N 3/20* (2013.01);
(Continued)

(58) Field of Classification Search
CPC ........ F01N 11/00; F01N 13/011; F01N 3/101; F01N 3/18; F01N 3/20; F01N 3/2006;
(Continued)

(56) References Cited

U.S. PATENT DOCUMENTS 6,973,777 B2   12/2005   Bayerle et al. .................. 60/289
7,140,177 B2   11/2006   Koyama et al. ................. 60/289
(Continued)

FOREIGN PATENT DOCUMENTS

DE    4120891 A1   1/1993   .............. F01N 11/00
DE   10249421 A1   5/2004   .............. F01N 11/00
(Continued)

OTHER PUBLICATIONS

German Office Action, Application No. 102014220815.7, 9 pages, dated Jun. 1, 2015.
(Continued)

*Primary Examiner* — Brandon D Lee
(74) *Attorney, Agent, or Firm* — Slayden Grubert Beard PLLC (57) ABSTRACT The present disclosure relates to internal combustion engines. The teachings thereof may include monitoring a secondary air system with which secondary air is introduced into exhaust of the internal combustion engine wherein individual cylinders of the internal combustion engine are associated with one of at least two cylinder banks and a separate exhaust duct is associated with each cylinder bank. The methods may include delivering secondary air with a compression arrangement via a common secondary air line divided into a number of individual secondary air sublines corresponding to the number of exhaust ducts at a branching point downstream of the compression arrangement; controlling the secondary air to simultaneously enable or inhibit the flow to the individual secondary air sublines; detecting (Continued)

values for the pressure downstream of the compression arrangement and upstream of the branching point; detecting pulsations of a pressure in each cylinder bank when the compression arrangement is activated and the throughflow control arrangement set into the open state; summing the pulsations; comparing each of summed-up values with threshold values; and if the respective threshold value is exceeded, identifying a fault in the throughflow control arrangement.

15 Claims, 7 Drawing Sheets (51) Int. Cl.
*F01N 3/18* (2006.01)
*F01N 3/20* (2006.01)
*F01N 3/32* (2006.01)
*F01N 9/00* (2006.01)
*F01N 11/00* (2006.01)
*F01N 13/00* (2010.01)

(52) U.S. Cl.
CPC ............ *F01N 3/2006* (2013.01); *F01N 3/22* (2013.01); *F01N 3/222* (2013.01); *F01N 3/227* (2013.01); *F01N 3/32* (2013.01); *F01N 9/00* (2013.01); *F01N 11/00* (2013.01); *F01N 13/011* (2014.06); *F01N 2250/04* (2013.01); *F01N 2270/04* (2013.01); *F01N 2270/10* (2013.01); *F01N 2430/06* (2013.01); *F01N 2550/14* (2013.01); *F01N 2560/025* (2013.01); *F01N 2560/07* (2013.01); *F01N 2560/08* (2013.01); *F01N 2900/0418* (2013.01); *F01N 2900/08* (2013.01); *F01N 2900/104* (2013.01); *F01N 2900/1406* (2013.01); *Y02T 10/22* (2013.01); *Y02T 10/26* (2013.01); *Y02T 10/47* (2013.01)

(58) Field of Classification Search
CPC . F01N 3/22; F01N 3/222; F01N 3/225; F01N 3/227; F01N 3/32; F01N 9/00; F01N 2250/04; F01N 2270/04; F01N 2270/10; F01N 2430/06; F01N 2550/14; F01N 2560/025; F01N 2560/07; F01N 2560/08; F01N 2900/0418; F01N 2900/08; F01N 2900/104; F01N 2900/1406; Y02T 10/22; Y02T 10/26; Y02T 10/47
See application file for complete search history.

(56) References Cited

U.S. PATENT DOCUMENTS

| 8,024,108 B2 | 9/2011 | Hacker ..................... 701/114 |
| 2004/0011027 A1 | 1/2004 | Hirooka et al. ............... 60/289 |
| 2005/0120711 A1* | 6/2005 | Koyama ................... F01N 3/22 60/289 |
| 2007/0084425 A1* | 4/2007 | Hirose ..................... F01L 1/344 123/90.1 |
| 2007/0137185 A1 | 6/2007 | Muraguchi ..................... 60/289 |
| 2009/0265074 A1 | 10/2009 | Heinrich et al. .............. 701/102 |
| 2014/0102206 A1* | 4/2014 | Oshima ................... G01L 9/008 73/715 |

FOREIGN PATENT DOCUMENTS

| DE | 102004058398 A1 | 7/2005 | ............. F01N 11/00 |
| DE | 102007062794 A1 | 7/2009 | ............. G01M 3/26 |
| DE | 102012222868 A1 | 6/2014 | ............. F01N 11/00 |
| JP | 2004100519 A | 4/2004 | ............. F01N 3/22 |
| JP | 2009221916 A | 10/2009 | ............. F01N 3/22 |
| WO | 2006/079407 A1 | 8/2006 | ............. F01N 11/00 |
| WO | 2007/087905 A1 | 8/2007 | ............. F01N 3/22 |
| WO | 2016/058775 A1 | 4/2016 | ............. F01N 11/00 |

OTHER PUBLICATIONS

International Search Report and Written Opinion, Application No. PCT/EP2015/071230, 22 pages, dated Nov. 27, 2015.
German Office Action, Application No. 102014220815.7, 5 pages, dated Aug. 22, 2016.

* cited by examiner

SECONDARY AIR SYSTEM IN AN EXHAUST GAS PURIFICATION SYSTEM OF AN INTERNAL COMBUSTION ENGINE

CROSS-REFERENCE TO RELATED APPLICATIONS

This application is a U.S. National Stage Application of International Application No. PCT/EP2015/071230 filed Sep. 16, 2015, which designates the United States of America, and claims priority to DE Application No. 10 2014 220 815.7 filed Oct. 14, 2014, the contents of which are hereby incorporated by reference in their entirety.

TECHNICAL FIELD

The present disclosure relates to internal combustion engines. The teachings thereof may include methods for monitoring the secondary air system in an exhaust gas purification system of an internal combustion engine with a plurality of cylinder banks.

BACKGROUND

For reducing the exhaust emissions of an internal combustion engine, three-way exhaust catalytic converters, referred to below for simplicity as catalytic converters, have proven their worth over a long time. In an internal combustion engine at working temperature, up to 98% of hydrocarbon, carbon monoxide, and oxides of nitrogen emissions are converted with systems that are available on the market. Emission behavior, nonetheless, may be inadequate during a cold start and the immediately subsequent warm-up phase of OTTO or once-through then out combustion engines, because the catalytic converter and the lambda probe have not yet reached the operating temperatures thereof ("light-off" temperatures).

One possible measure for increasing the quality of the exhaust gases consists of blowing fresh air (so-called secondary air) into the exhaust manifold close to the exhaust valves, so that when starting the internal combustion engine, the unburnt exhaust gas components resulting from a rich startup mixture are oxidized by post-combustion at temperatures of up to 600° C. Said exothermal reaction results in an increase in the exhaust gas temperature and thereby to a reduction of the warm-up time of the catalytic converter. At the same time, the unburnt exhaust gas components are reduced.

To introduce the secondary air, a so-called secondary air pump is typically used. It may include an electrically driven compressor that sucks air from the surroundings and blows said air through a secondary air line into the exhaust duct close to the exhaust valves. In the secondary air line an electrically controlled valve, also referred to as a secondary valve, is switched on. Said valve is closed outside of the cold start and warm-up of the internal combustion engine.

In the case of combustion engines with cylinders, for example 6, 8, or 12 cylinders, that are not disposed in a single row (in-line engine), the individual cylinders are associated with so-called cylinder banks. With an 8-cylinder internal combustion engine for example, a first cylinder bank is associated with cylinders 1-4 and a second cylinder bank is associated with cylinders 5-8. In this case, each cylinder bank can be supplied with air by means of a dedicated secondary air pump with associated secondary air lines or a single secondary air pump supplies both cylinder banks, wherein a line connected to the pump output branches and a dedicated secondary air line leads to each cylinder bank. In each of the secondary air lines, a secondary valve is switched on, to blow bank-selective secondary air.

Because the secondary air system is relevant to the exhaust from the internal combustion engine, it must be checked for proper functioning during operation. Legislative measures provide that not only is the secondary air system as such to be tested, e.g., globally for operability, but in the case of a system with a plurality of cylinder banks and thus a plurality of secondary air paths, each individual subsystem must be diagnosed, e.g., bank-selective fault detection must be provided. In DE 102 49 421 A1, a method for monitoring the delivery of secondary air into the exhaust gas of an internal combustion engine is described, wherein the internal combustion engine comprises at least two partly separated exhaust systems, in each of which an exhaust gas catalytic converter and upstream thereof a lambda probe are disposed in each case. A secondary air pump transports the induced secondary air first via a single secondary air line containing an electrically controlled secondary valve and that branches downstream of the secondary valve into individual secondary air lines corresponding to the number of the exhaust systems for transporting secondary air into the respective exhaust systems. A value for the entire air flow introduced into the exhaust systems is determined from the signal of at least one air flow meter. For determining the masses of air actually introduced into the individual exhaust systems, the output signals of the lambda probes in the exhaust systems are used in order to determine an unequal distribution of the masses of air delivered to the individual exhaust systems.

In WO 2007/087905 A1, a method and a device for monitoring the secondary air system in an emission control system of an internal combustion engine are described. The individual cylinders of the internal combustion engine are divided into at least two cylinder banks and each cylinder bank is associated with a separate exhaust duct. Secondary air is transported using a compression arrangement and is introduced into the respective exhaust ducts via individual secondary air lines corresponding to the exhaust ducts. The flow of the secondary air is adjusted independently in each of the individual secondary air lines using an electrically controlled throughflow control arrangement. From the signal of a secondary air flow meter, a value for the entire secondary air flow that is introduced into the exhaust ducts is determined. The throughflow control arrangements are controlled into an open position, the value for the entire secondary air flow is detected and then the throughflow control arrangements are individually controlled into a closed position at time intervals relative to each. The values for the secondary air flows occurring during this before and after the closing of the individual throughflow control arrangements are detected and said values are compared with a plurality of different threshold values. Depending on the result of the comparisons, a differentiation is made of the fault location in relation to the respective cylinder banks.

An auxiliary air delivery system from DE 10 2004 058 398 A1 delivers auxiliary air to exhaust pipes, which are each fitted to two banks of the internal combustion engine, via an auxiliary air delivery pipe with a connection segment and two branch segments that are separated from the connection segment. An air control valve is disposed in each branch segment and a pressure sensor is provided in the connection segment. An abnormality diagnosis is conducted in relation to the two air control valves that are opened at different times, wherein the two air control valves comprise a first air control valve that is opened first and a second air control valve that is opened second, based on a combination of pressure fluctuations in the connection segment detected by the pressure sensor when opening the first air control valve and a pressure fluctuation in the connection segment detected by the pressure sensor when opening the second air control valve.

A method for the diagnosis of a secondary air system from DE 10 2007 062 794 A1, claims to detect (a) a leak in an exhaust segment downstream of the secondary valve can be detected and (b) significant faults between the secondary air pump and the secondary valve. The detection strategy of said known method consists in reducing pressure fluctuations or pressure pulsations that are produced by the opening and closing of exhaust valves of the internal combustion engine concerned in the case of a leak between the internal combustion engine and the secondary valve. The pressure deviations from an average value are thereby less than for a secondary air system with no leak.

A method and a device for diagnosing the functionality of a secondary air system comprising an air pump, an air pressure sensor, and a valve are described in DE 10 2012 222 868 A1. The method comprises the sequential operation of the secondary air system in a first operating state, in a second operating state and in a third operating state. During the sequential mode, the following steps are carried out: (a) measuring the time variation of the pressure in the secondary air system with the air pressure sensor, (b) calculating the variation with time of a form factor based on the variation with time of a measured pressure signal that is output by the air pressure sensor, (c) determining the variation with time of a signal power based on the variation with time of the pressure signal, (d) modelling the variation with time of a model signal power based on at least one variable that characterizes the operating state of the internal combustion engine, (e) calculating the variation with time of a power factor based on the determined signal power and on the modelled model signal power, and (f) diagnosing the functionality of the secondary air system based on the variation with time of the form factor and the variation with time of the power factor.

SUMMARY

The teachings of the present disclosure may enable a method and a device for monitoring the secondary air system in an emission control system of an internal combustion engine with a plurality of cylinder banks that enables in a simple manner cylinder bank selective faults to be detected.

For example, some embodiments include a method for monitoring the secondary air system (20) of a multi-cylinder internal combustion engine (10), with which secondary air is introduced into the exhaust of the internal combustion engine (10), wherein the individual cylinders (Z1-Z6) of the internal combustion engine (10) are divided into at least two cylinder banks (ZB1, ZB2) and a separate exhaust duct (12, 13) is associated with each cylinder bank (ZB1, ZB2), secondary air is delivered to both cylinder banks (ZB1, ZB2) using a compression arrangement (21) via a common secondary air line (22) that divides into a number of individual secondary air sublines (24, 25) corresponding to the number of exhaust ducts (12, 13) at a branching point (26) downstream of the compression arrangement (21), the flow of the secondary air is simultaneously enabled or inhibited using a throughflow control arrangement (SLV1, SLV2) disposed in the individual secondary air sublines (24, 25), values for the pressure (p) are detected by means of a pressure sensor (23) disposed downstream of the compression arrangement (21) and upstream of the branching point (26), pressure pulsations of the pressure (p) are detected cylinder bank-specifically with the compression arrangement (21) activated and the throughflow control arrangement (SLV1, SLV2) set into the open state and are added up, the cylinder bank-specifically summed-up values (SUM_ZB1, SUM_ZB2) are each compared with threshold values (SW_ZB1, SW_ZB2) and if the respective threshold value (SW_ZB1, SW_ZB2) is exceeded a throughflow control arrangement (SLV1, SLV2) that is not opened or not fully opened or a blockage or a leak in the corresponding secondary air subline (24, 25) is detected.

In some embodiments, before the cylinder bank-specific adding up of the pressure pulsations, the pressure signal (p) is filtered by means of a bandpass filter (B11).

In some embodiments, an adaptive bandpass filter is used as the bandpass filter (B11), the cut-off frequencies of which are dependent on the revolution rate (N) and the battery voltage (VB) of the on-board electrical system of the internal combustion engine (10).

In some embodiments, a bandpass filter with fixed cut-off frequencies is used as the bandpass filter (B11), wherein said cut-off frequencies are determined experimentally and placed in a value memory (33) of a control device (30) controlling and/or regulating the internal combustion engine (10).

In some embodiments, the threshold values (SW_ZB1, SW_BZ2) are placed in a characteristic field of a value memory (33) of a control device (30) controlling and/or regulating the internal combustion engine (10) as a function of a cylinder fill level (MAF) summed-up during the blowing in of secondary air and a coolant temperature (TCO) of the internal combustion engine (10).

In some embodiments, the threshold values (SW_ZB1, SW_BZ2) comprise identical values for equal geometric lengths of the secondary air sublines (24, 25).

Some embodiments may include a method for monitoring the secondary air system (20) of a multi-cylinder internal combustion engine (10), with which secondary air is introduced into the exhaust gas of the internal combustion engine (10), wherein the individual cylinders (Z1-Z6) of the internal combustion engine (10) are divided into at least two cylinder banks (ZB1, ZB2) and a separate exhaust duct (12, 13) is associated with each cylinder bank (ZB1, ZB2), secondary air is delivered to both cylinder banks (ZB1, ZB2) using a compression arrangement (21) via a common secondary air line (22) that divides into a number of individual secondary air sublines (24, 25) corresponding to the number of exhaust ducts (12, 13) at a branching point (26) downstream of the compression arrangement (21), the flow of the secondary air is simultaneously enabled or inhibited using a throughflow control arrangement (SLV1, SLV2) disposed in the individual secondary air sublines (24, 25), values of the pressure (p) are detected by means of a pressure sensor (23) disposed downstream of the compression arrangement (21) and upstream of the branching point (26), pressure pulsations of the pressure (p) are detected cylinder bank-specifically with the compression arrangement turned off (21) and the throughflow control arrangement set into the closed state (SLV1, SLV2), values for the ambient pressure (p_AMB) are detected, the pressure differences between the individual pulses of the pressure (p) and the values for the ambient pressure (p_AMB) are formed cylinder bank-specifically, the cylinder bank-specific pressure differences are added up and a check is carried out for the respective sums (SUM'_ZB1, SUM'_ZB2) as to whether the sums are not equal to zero and if said sums (SUM'_ZB1, SUM'_ZB2) are different from zero, a stuck open secondary valve (SLV1, SLV2) is detected.

In some embodiments, the throughflow control arrangement (SLV1, SLV2) is implemented as electrically controlled valves that are closed in the deenergized state.

In some embodiments, the throughflow control arrangements (SLV1, SLV2) are implemented as mechanical non-return valves.

In some embodiments, in the event of a detected malfunction of a component of the secondary air system (20), a cylinder bank-specific entry in a fault memory (34) of a control device (30) controlling and/or regulating the internal combustion engine (10) is carried out.

In some embodiments, an electrically driven secondary air pump is used as the compression arrangement (SLP).

Some embodiments may include a device for monitoring the secondary air system (20) of a multi-cylinder internal combustion engine (10), with which secondary air is introduced into the exhaust of the internal combustion engine (10), characterized in that the device is designed and arranged such that the method as described above may be employed.

BRIEF DESCRIPTION OF THE DRAWINGS

Exemplary embodiments of the present invention are described in detail below with respect to the accompanying figures. In the figures.

DETAILED DESCRIPTION

Some embodiments may include a method for monitoring the secondary air system of a multi-cylinder internal combustion engine, with which secondary air is introduced into the exhaust of the internal combustion engine. The individual cylinders of the internal combustion engine are divided into at least two cylinder banks and a separate exhaust duct is associated with each cylinder bank. The secondary air is delivered to both cylinder banks using a compression arrangement via a common secondary air line that divides at a branching point downstream of the compression arrangement into individual secondary air sublines corresponding to the number of exhaust ducts. The flow of the secondary air is simultaneously enabled or inhibited using throughflow control arrangements disposed in the individual secondary air sublines. Values for the pressure are detected by means of a pressure sensor disposed downstream of the compression arrangement and upstream of the branching point. Pressure pulsations of the pressure with the compression arrangement activated and the throughflow control arrangement set into the open state are detected and added up cylinder bank-specifically. The cylinder bank-specifically summed-up values are each compared with threshold values and a non-opened or not fully opened throughflow control arrangement or a blockage or leak in the corresponding secondary air subline is detected if the respective threshold value is exceeded.

The analysis of pressure pulsations of the signal of a single pressure sensor in the associated secondary air line common to both cylinder banks of the internal combustion engine and simultaneous opening and closing of the two throughflow control arrangements in the secondary air sublines result in a very simple and inexpensive solution for monitoring the secondary air system. Because the throughflow control arrangements are opened and closed synchronously, with the use of electrically controlled throughflow control arrangements only a single output (pin) is necessary on the electronic control device, which contributes to component reduction and thereby to space-saving. By the simultaneous control of the throughflow control arrangement, the additional valve phase that is necessary according to the prior art, during which one valve is opened and the other valve is closed following the end of blowing in of secondary air, which has a negative effect on exhaust emissions, is dispensed with.

In some embodiments, simple mechanical non-return valves are used as throughflow control arrangements, the opening pressures of which are identical and which open automatically on reaching said opening pressure and close again when the pressure in the secondary air sublines reduces. This results in a very inexpensive design of the monitoring method for the secondary air system of the internal combustion engine.

By a simple association of the pressure pulses occurring in the pressure signal with the individual exhaust banks by means of phase synchronization that is carried out based on the signal of a crankshaft sensor and cylinder bank-specific adding up of the pressure pulses with subsequent threshold value comparison, the fault location can be differentiated in respect of the respective cylinder bank in a simple manner. In some embodiments, filtering by means of a bandpass filter is carried out before the adding up of the cylinder bank-specific pressure pulses. Interfering pulsations that occur because of the operation of the compression arrangement, are as a rule implemented as a secondary air pump, and reflections in the secondary air sublines are filtered out.

In some embodiments, an adaptive bandpass filter is used as a bandpass filter, the cut-off frequencies of which depend on the revolution rate and the battery voltage of the on-board electrical system of the internal combustion engine. If the requirements on the quality of the filtering are not so high, then a simple bandpass filter with fixed cut-off frequencies is sufficient, wherein said cut-off frequencies are determined experimentally and stored in a value memory of a control device controlling and/or regulating the internal combustion engine.

In some embodiments, the cylinder bank-specific threshold values are stored in a characteristic field of a value memory of a control device controlling and/or regulating the internal combustion engine as a function of a summed-up cylinder filling and a coolant temperature of the internal combustion engine during the blowing in of secondary air. This contributes to monitoring of the secondary air system with high reliability and accuracy.

In the case of equal geometric lengths of the secondary air sublines, a single threshold value valid for both cylinder banks may be used. This results in a particularly simple monitoring method. Some embodiments include a method for monitoring the secondary air system of a multi-cylinder internal combustion engine, with which secondary air is introduced into the exhaust of the internal combustion engine. The individual cylinders of the internal combustion engine are divided into at least two cylinder banks and a separate exhaust system is associated with each cylinder bank. The secondary air is delivered to both cylinder banks using a compression arrangement via a common secondary air line that divides at a branching point downstream of the compression arrangement into individual secondary air sublines corresponding to the number of exhaust ducts. The flow of the secondary air is simultaneously enabled or inhibited using throughflow control arrangements disposed in the individual secondary air sublines. Values for the pressure are detected by means of a pressure sensor disposed downstream of the compression arrangement and upstream of the branching point. Pressure pulsations of the pressure are detected cylinder bank-specifically with the compression arrangement turned off and the throughflow control arrangement set into the closed state. Values for the ambient pressure are detected and the pressure differences between the individual pulses of the pressure and the values for the ambient pressure are formed cylinder bank-specifically. The cylinder bank-specific pressure differences are added up and a check is carried out for the respective sums as to whether the sums are not equal to zero. If said sums differ from zero, a stuck-open secondary valve is detected.

It is possible in a simple manner to detect a stuck-open secondary valve, also referred to as a hanging open secondary valve, and to generate a corresponding, cylinder bank-specific fault entry in a fault memory. In the event of a secondary valve hanging open after the end of the blowing in of secondary air, during the operation of the internal combustion engine it is possible for dirt particles that are present in the exhaust gas, especially soot particles, to pass to the compression arrangement and to cause damage to the compression arrangement, especially to the movable parts of the compression arrangement.

The description below uses an internal combustion engine with six cylinders as an example. However, the teachings of the present disclosure may be used on any other internal combustion engine comprising a plurality of cylinders and at least two cylinder banks, wherein the engine design (V-engine, W-engine, boxer engine) has no effect if a dedicated secondary air line with associated secondary air valves is provided for every cylinder bank.

Figure 1:
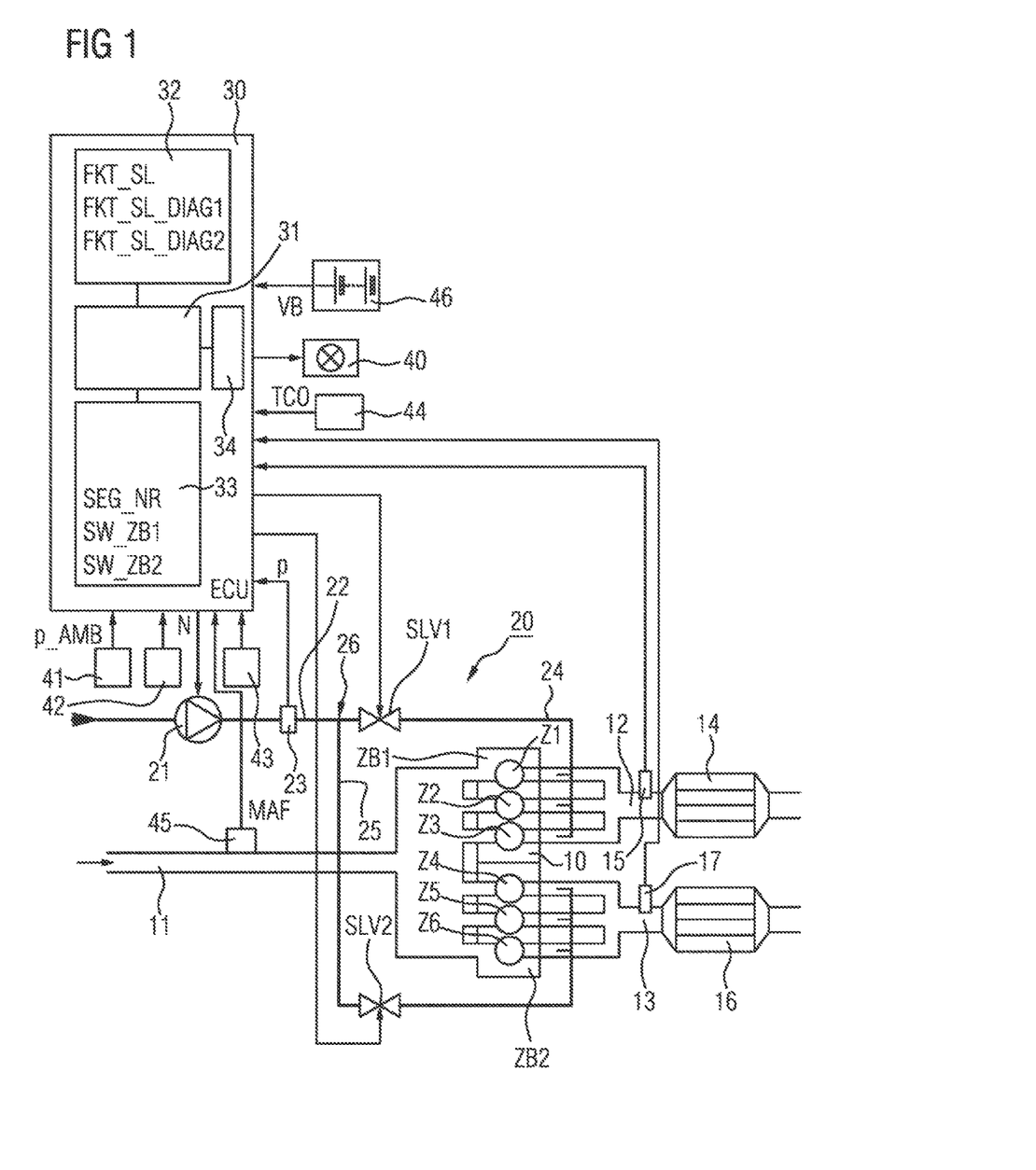
FIG. 1 shows in a schematic representation an internal combustion engine with an emission control system and a secondary air system.

FIG. 1 shows an internal combustion engine 10 in a schematic representation. Said engine 10 comprises six cylinders Z1-Z6, wherein the cylinders Z1-Z3 are associated with a first cylinder bank ZB1, the exhaust gas of which flows into a common exhaust duct 12. The cylinders Z4-Z6 are associated with a second cylinder bank ZB2, the exhaust gas of which flows into a common exhaust duct 13. There is an exhaust gas catalytic converter 14 in the exhaust duct 12 and upstream thereof an exhaust gas sensor 15. There is an exhaust gas catalytic converter 16 in the exhaust duct 13 and upstream thereof an exhaust gas sensor 17.

The exhaust catalytic converters 14, 16 may comprise three-way exhaust catalytic converters or oxides of nitrogen catalytic converters. Some embodiments may comprise a plurality of exhaust catalytic converters in the individual exhaust ducts 12, 13. The exhaust gas sensors 15, 17 may comprise lambda probes. In this case, both so-called binary lambda probes can be used, which comprise a step characteristic for an air ratio of lambda=1 relative to the output signal, or so-called linear lambda probes can be used, which exhibit a substantially linear profile in the output signal thereof in a relatively wide range around lambda=1.

The internal combustion engine 10 further comprises a primary air system 11, via which the air required for fuel combustion in the cylinders Z1-Z6 is delivered. The primary air system 11 comprises an air flow meter 45 in an intake tract. For reasons of clarity, the fuel delivery system for the internal combustion engine 10 is not shown in FIG. 1.

A bank-selective secondary air system 20 is provided for rapid warming up of the exhaust catalytic converters 14, 16 in the event of a cold start and a subsequent warm-up phase of the internal combustion engine 10. An electrically driven secondary air pump 21 sucks in fresh air via a filter. From the pressure side of the secondary air pump 21, a common secondary air line 22 leads towards the individual cylinder banks ZB1, ZB2, in order then to split into two cylinder bank-selective secondary air sublines 24, 25 in the vicinity of the cylinder banks ZB1, ZB2 at a branching point 26.

In the secondary air subline 24 for the cylinder bank ZB1, an electrically controlled secondary valve SLV1 is switched on, in the secondary air subline 25, an electrically controlled secondary valve SLV2 is switched on. The secondary air sublines 24, 25 on the engine block may be connected to the exhaust ducts immediately after the exhaust valves. The secondary air valves SLV1, SLV2 may be disposed directly on the engine block; they are shown in FIG. 1 in the secondary air sublines 24, 25 somewhat remote from the engine block for clarity.

A pressure sensor 23 detects the pressure both during the blowing in of secondary air and also after the end of the blowing in of secondary air and is disposed in the common secondary air line 22 downstream of the secondary air pump 21 and upstream of the branching point 26 of the two bank-selective secondary air sublines 24, 25.

With the secondary air pump 21 activated and the secondary air valves SLV1, SLV2 opened, fresh air is delivered to the exhaust systems 12, 13 close to gas outlet valves, which ensures that, especially in a starting phase of the internal combustion engine 10, unburnt fuel that passes into the exhaust ducts 12, 13 is oxidized, so that the exhaust catalytic converters 14, 16 warm up faster to the operating temperature thereof. For delivering the secondary air, instead of the secondary air pump 21 other compression arrangements that deliver fresh air into the exhaust tract can be provided, for example a conventional type of secondary air charger.

As a throughflow control arrangement for adjusting the secondary air flow to the individual exhaust ducts, in said exemplary embodiment according to FIG. 1 electrically controlled secondary air valves are provided. Instead of said electrically controlled secondary air valves, pneumatically controlled secondary air valves or purely mechanically opening valves in the form of non-return valves can also be provided, which remain open automatically at a predetermined overpressure. It must only be ensured that both valves open and close synchronously, e.g., simultaneously. An electronic control device 30 is associated with the internal combustion engine 10 and is connected to all actuators and sensors of the internal combustion engine 10 via signal lines and data lines. In particular, the control device 30 is connected to the air flow meter 45, the secondary air pump 21, the two secondary air valves SLV1, SLV2, the two exhaust gas sensors 15, 17, the pressure sensor 23, an ambient air pressure sensor 41, a revolution rate sensor 42, a crankshaft angle sensor 43, and a coolant temperature sensor 44. Moreover, a signal VB is delivered to the control device 30 that is indicative of the level of the voltage of an on-board electrical system battery 46 of the motor vehicle driven by the internal combustion engine 10.

The control device 30, which is often referred to as the engine control unit or simply as the engine controller, may comprise a computing unit (processor) 31 coupled to a program memory 32, a value memory (data memory) 33, and a fault memory 34. In the program memory 32 and the value memory 33, programs or values are stored that are necessary for the operation of the internal combustion engine 10. Besides the calculation of the fuel injection quantities, of the point in time or end of fuel injection, and/or the ignition control of the internal combustion engine 10, a known, as a rule characteristic field-based function FKT_SL is implemented in software in the program memory 32, using which depending on operating parameters, especially depending on a coolant temperature TCO of the internal combustion engine 10, the secondary air system 20 is activated in the event of a cold start of the internal combustion engine 10 and is deactivated again on reaching the operating temperatures of the exhaust catalytic converters 14, 16.

Moreover, functions FKT_SL_DIAG1, FKT_SL_DIAG2 for monitoring the secondary air system 20 may be implemented in the program memory 32 and are able to bank-selectively determine a malfunction in a component of the secondary air system 20 disposed downstream of the pressure sensor 23 based on the signals of the pressure sensor 23 and the pressure pulsations occurring, as is described in detail using the following description of FIGS. 2-9. If when using said functions FKT_SL_DIAG1, FKT_SL_DIAG2 a fault is determined, then said fault is entered into the fault memory 34 of the control arrangement 30 in a non-volatile manner, so that it can be read out at the next visit of the motor vehicle to the workshop. In addition, the presence of a fault can be visually and/or audibly brought to the attention of the driver of the motor vehicle driven by the internal combustion engine 10 by means of a fault display device 40.

In the value memory 33, inter alia different threshold values SW_ZB1, SW_ZB2 and parameters are stored, the meanings of which for the diagnosis of the secondary air system are also explained in detail using the following description of FIGS. 2-9. Such a diagnosis may include confirming that the secondary air pump 21 is currently delivering fresh air, which can be checked by means of any known method, for example according to the method described in DE 41 20 891 A1.

Figure 2:
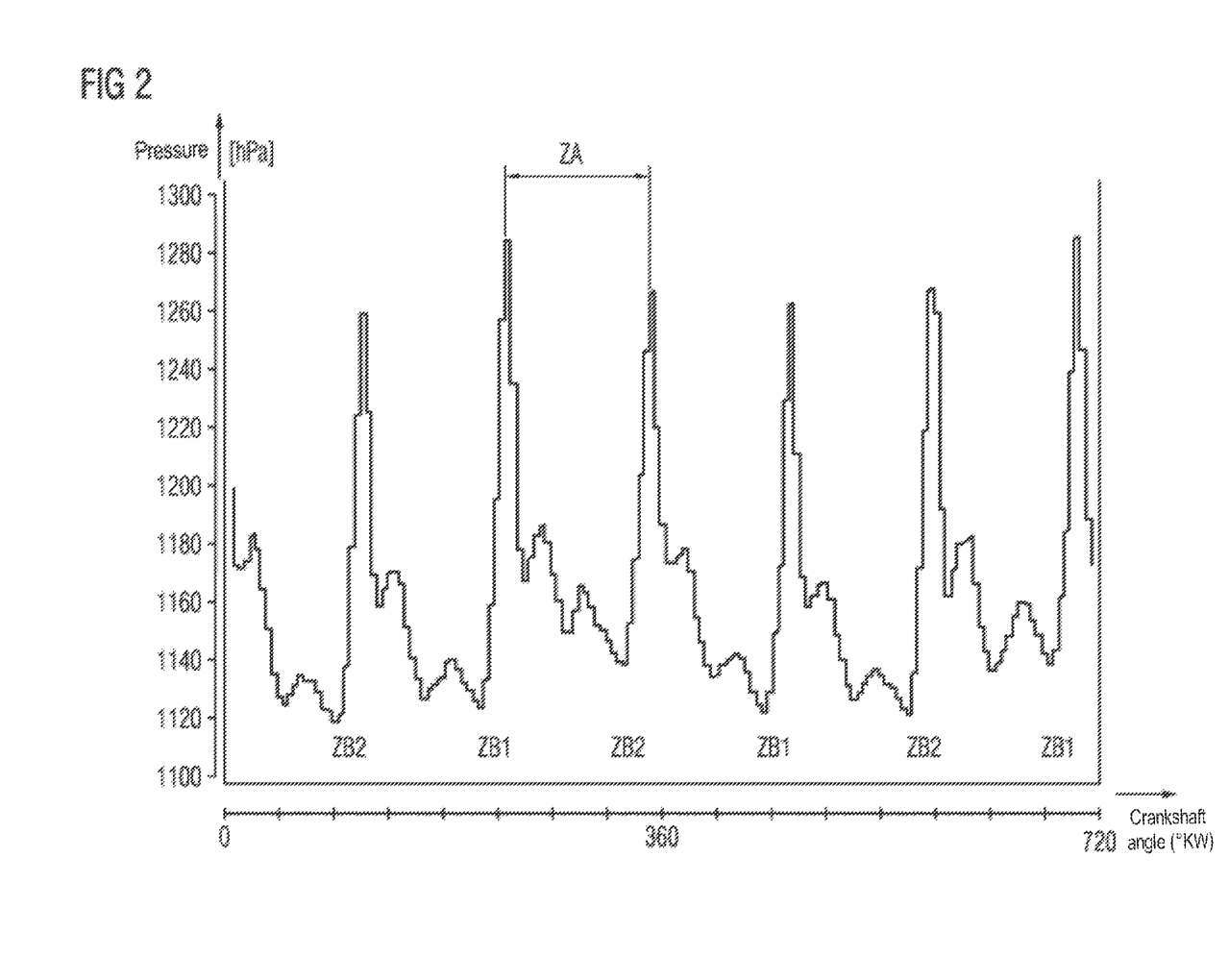
FIG. 2 shows a diagram of the exhaust back pressure as a function of the crankshaft angle for a properly functioning secondary air system.

The diagram shown in FIG. 2 shows the basic profile of the exhaust back pressure in units of hPa as a function of crankshaft angle ° KW for a 6-cylinder internal combustion engine with two cylinder banks ZB1, ZB2. Because of the ignition separation between 2 successive ignitions of the fuel-air mixture in the combustion chambers of the cylinder Z1-Z6, fluctuations of the pressure profile, e.g., pressure pulsations, result that are analyzed to check the secondary air system 20. Because a working cycle of a four-stroke combustion engine includes two crankshaft revolutions, 720° KW, for an internal combustion engine with six cylinders an ignition separation of 120° KW results. Said ignition separation is provided in FIG. 2 with the reference sign ZA.

If a leak or blockage occurs in one of the two secondary air sublines 24, 25, the pressure pulsations in the corresponding secondary air subline 24, 25 will be smaller. The damped profile of the pressure shows in the signal of the pressure sensor 23. The degree of damping is in this case inter alia a function of the distance between the installation point of the pressure sensor 23 and the point of introduction of the corresponding secondary air subline 24, 25 into the exhaust duct.

Figure 3:
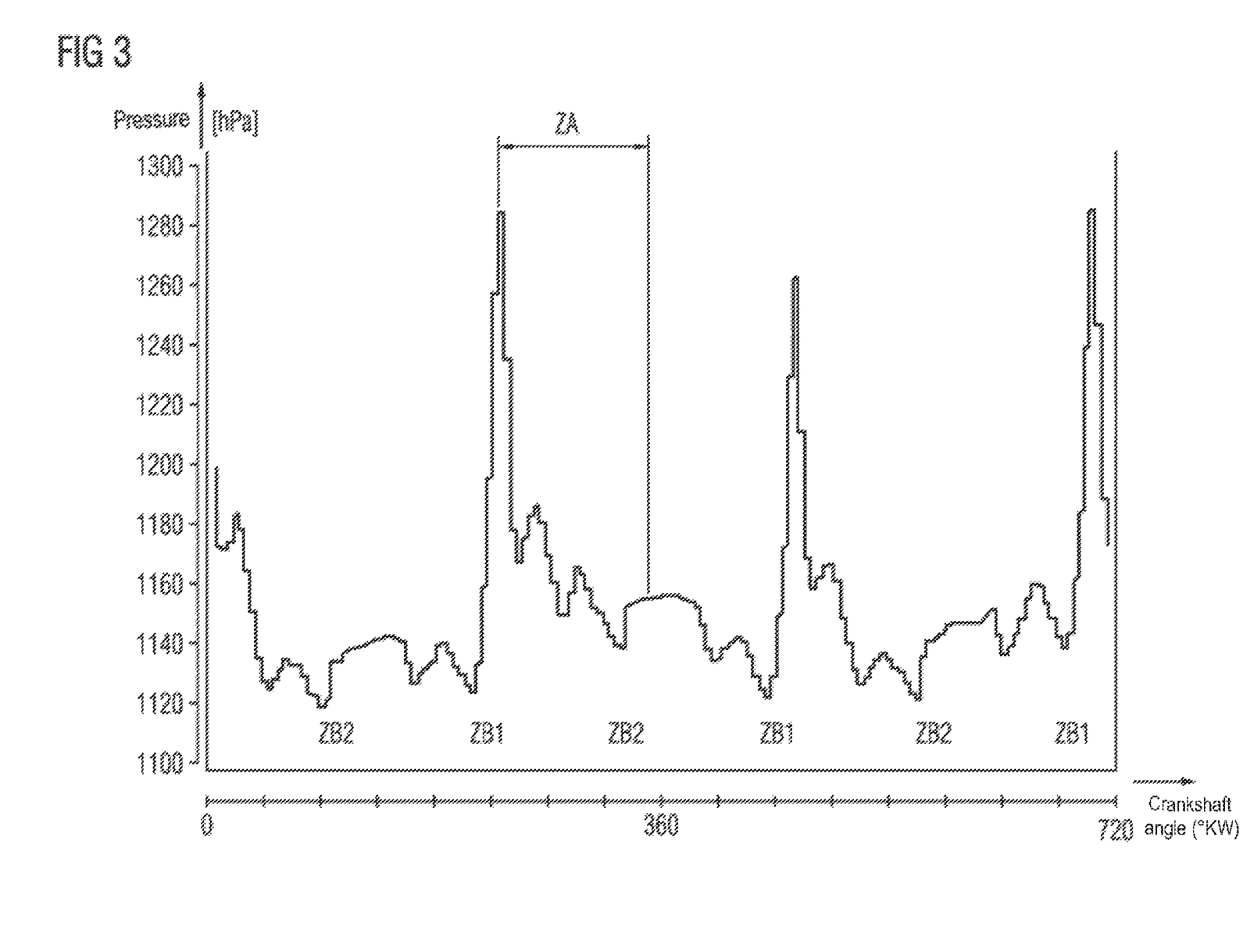
FIG. 3 shows a diagram for the exhaust back pressure as a function of crankshaft angle in the case of a leak or blockage in one of the two secondary air paths of the secondary air system.

The diagram in FIG. 3 shows the profile of the exhaust back pressure in units of hPa as a function of the crankshaft angle ° KW for the case in which a leak or blockage occurs in the secondary air subline 25 associated with the second cylinder bank ZB2. The pressure pulsations in the secondary air subline 25 are significantly smaller than the pressure pulsations in the secondary air subline 24 associated with the first cylinder bank ZB1. Also in this representation, the ignition separation is again provided with the reference sign ZA.

Figure 4:
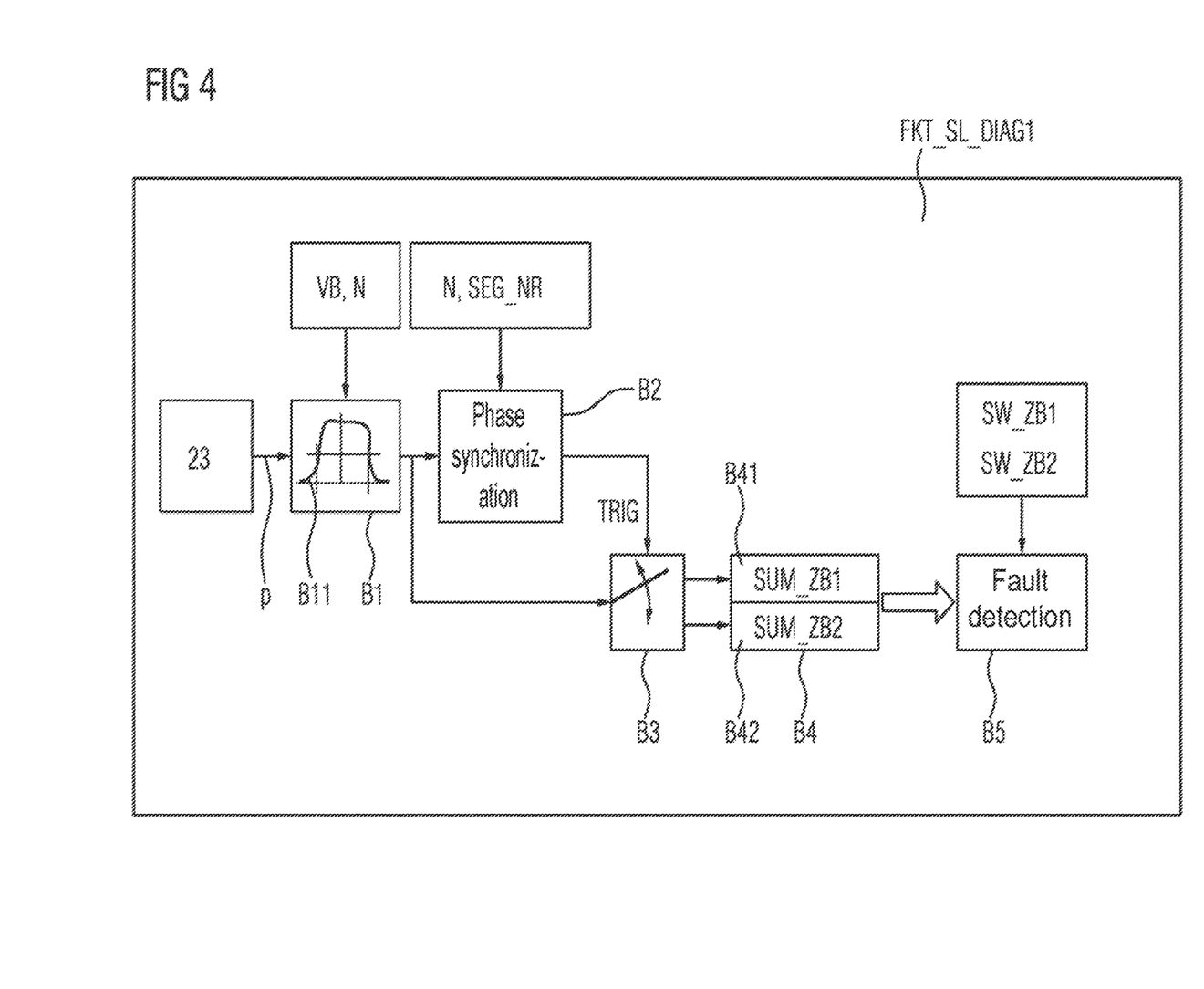
FIG. 4 shows a block diagram for the bank-selective detection of a leak or a blockage in a secondary air subline.

FIG. 4 shows in the form of a block diagram a function FKT_SL_DIAG1 for determining a leak or a blockage in a secondary air subline 24, 25 of the secondary air system 20. The signal of the pressure sensor 23 disposed downstream of the secondary air pump 21 and upstream of the secondary air valves SLV1, SLV2 is used for carrying out the diagnosis. The diagnostic method is carried out during the active operation of the secondary air system 20. This means that the secondary air pump 21 is switched on and the secondary air valves SLV1 and SLV2 are opened. In the case of the use of electrically controlled secondary air valves SLV1 and SLV2, said valves are synchronously placed into the open state by means of corresponding signals of the control device 30; in the case of the use of mechanical non-return valves, said valves automatically open simultaneously if the pressure produced by the secondary air pump 21 reaches the opening pressure of said non-return valves.

The signal p of the pressure sensor 23 may be sampled at equal intervals during the active operation of the secondary air system 20. The expression "equidistant" can relate either to the time or to the crankshaft angle ° KW here.

During the operation of the secondary air system 20, it may be continuously checked as to whether a predetermined period of time has elapsed since activation of the secondary air function. Said activation time is inter alia dependent on the design conditions, such as the installation point and the size of the catalytic converters 14, 16, and is determined empirically and is placed in the data memory 33 of the control device 30. Typical values for the activation time are for example 10-30 seconds. If said period of time has not yet elapsed, the secondary air pump 21 remains switched on, the two secondary air valves SLV1 and SLV2 are opened, whereby the exhaust catalytic converters 14, 16 are warmed up because of the occurring exothermic reaction.

Besides the exhaust gas pulsations due to the combustion processes in the combustion chambers of the cylinders Z1-Z6 of the internal combustion engine 10, the pressure pulsations that are detected by the pressure sensor 23 also contain pulsations caused by the operation of the secondary air pump 21 itself and to a lesser extent by reflections in the secondary air sublines 24, 25. The closer the pressure sensor 23 sits to the exhaust tract, and thereby the further away it is from the secondary air pump 21, the greater is the influence of the exhaust gas pulsations on the pressure signal p. In order to take said influences into account during the diagnosis, the signal p provided by the pressure sensor 23 is fed to a block B1 that comprises an adaptive bandpass filter B11. Said bandpass filter B11 separates low and high frequency components.

The frequency of the pressure signal caused by the secondary air pump 21 is relatively constant and substantially only dependent on the battery voltage VB of the on-board electrical system of the motor vehicle. The frequency of the exhaust back pressure signal is variable and is a function of the revolution rate N of the internal combustion engine. Therefore, the values for the battery voltage VB and the revolution rate N are delivered to the block B1 and the cut-off frequencies of the bandpass filter B11 are adapted in every step so that only the exhaust back pressure signal is available at the output of the bandpass filter B11 for further processing. The interfering frequencies that could distort the result of the analysis of the pressure signal p are thereby filtered out. In some embodiments, a bandpass filter B11 comprises fixed cut-off frequencies and the values thereof are determined experimentally on a test bed.

Figure 5:
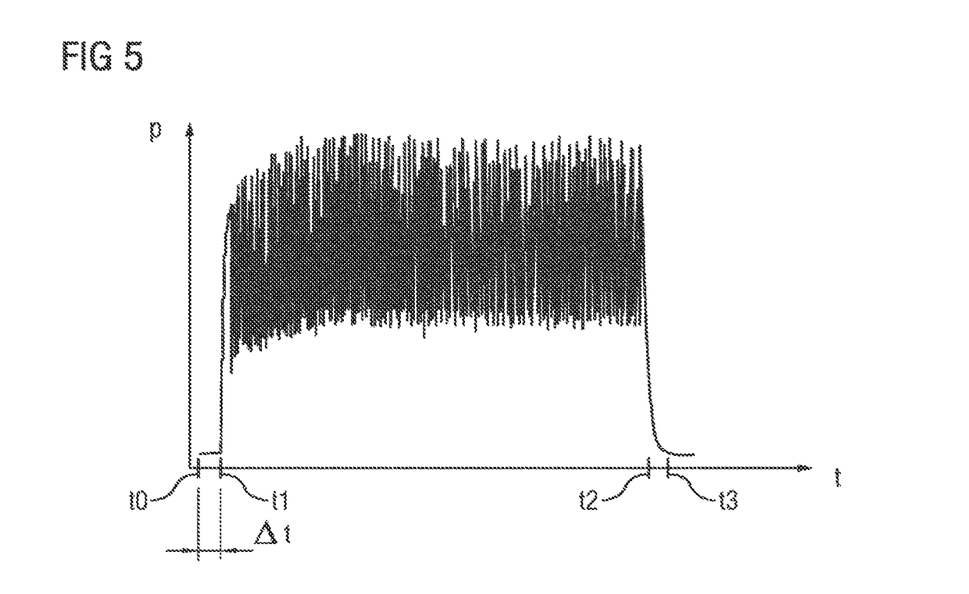
FIG. 5 shows a diagram of the variation with time of the exhaust back pressure determined by the pressure sensor.

FIG. 5 shows the variation with time of the pressure p as provided by the pressure sensor 23, e.g., before the filtering by means of the block B1. At the point in time t0, the secondary air pump 21 is switched on and, following a certain time delay At that the secondary air pump 21 requires to build up the necessary pressure, at a point in time t1 the two secondary air valves SLV1, SLV2 are opened, or open automatically in the case of using mechanical pressure relief valves, when the opening pressure is reached. At a point in time t2, the secondary air pump 21 is switched off and at a point in time t3 the two secondary air valves SLV1, SLV2 are closed again, or close automatically when using mechanical pressure relief valves.

The filtered pressure signal that now represents the pure exhaust back pressure, but which is not yet cylinder bank-selective, is fed to a block B2 that is implemented to carry out phase synchronization. In this connection, phase synchronization means the identification and association of the individual pulses of the filtered pressure signal with the individual cylinders Z1-Z6. Because it is known which cylinder Z1-Z6 belongs to which cylinder bank ZB1, ZB2, thereby assignment of the respective pressure pulses to the individual cylinder banks ZB1, ZB2 is carried out. The block B2 can therefore also be referred to as an assignment unit.

The assignment is carried out with correlation of the revolution rate N of the internal combustion engine 10 and the signal of the crankshaft angle sensor 43, which is representative of the profile of the crankshaft angle KW of the crankshaft of the internal combustion engine 10. Preferably, a sensor wheel with teeth and a gap, for example a so-called 60-2 sensor wheel, is disposed on the crankshaft or on a shaft connected to said sensor wheel and is associated with the crankshaft angle sensor 43. The signal of the crankshaft angle sensor 43 is detected over a respective working cycle, which for a four-stroke combustion engine comprises a 720° crankshaft angle, and is associated with respective segment regions SEG_NR, which in turn are each associated with a cylinder Z1-Z6. The crankshaft angle sensor 43 thereby provides the information as to which pressure pulse originates from which cylinder Z1-Z6 and thereby the cylinder bank association.

Depending on the segment region SEG_NR within which the pressure pulse occurs, the pulse is associated using a changeover switch contained in a block B3 controlled by the block B2 by means of a signal TRIG, either with the cylinder bank ZB1 or the cylinder bank ZB2. On the output side, the block B3 is connected to a block B4 containing two bank-specific integrators B41, B42. Depending on the switch position of the changeover switch in block B3, the individual pressure pulses are fed to either the integrator B41 of the first cylinder bank ZB1 or the integrator B42 of the second cylinder bank ZB2, each of which adds up the pressure pulses. Following the end of the blowing in of secondary air, the values SUM_ZB1 and SUM_ZB2 added up by the integrators B41, B42 are separately compared with predetermined threshold values SW_ZB1, SW_BZ2 in a block 5. Said threshold values SW_ZB1, SW_BZ2 are placed in a characteristic field of the value memory 33 of the control device 30, for example as a function of the summed-up cylinder filling MAF and the coolant temperature TCO during the blowing of secondary air.

Figure 6:
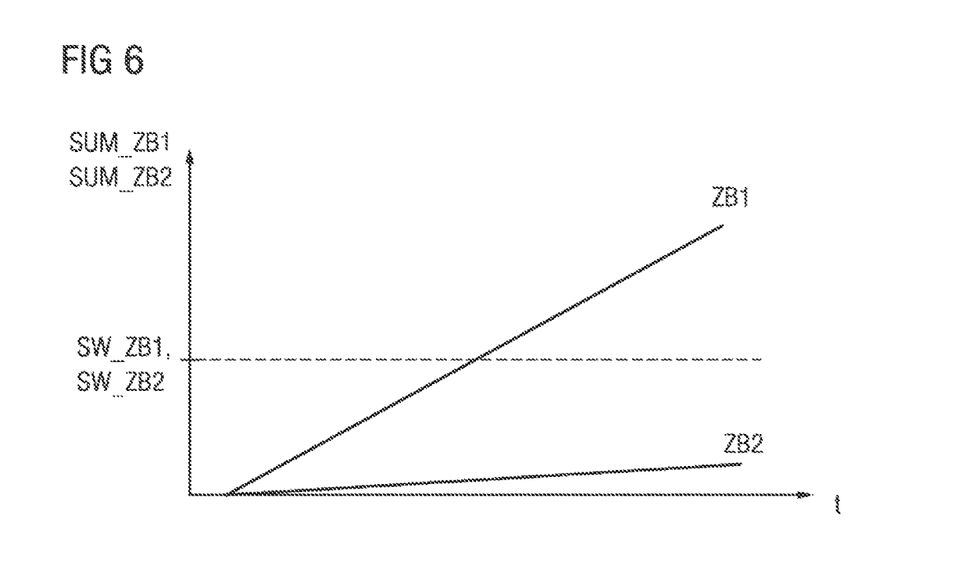
FIG. 6 shows diagrams of the two integrated bank-specific pressure values.

If the two bank-specific secondary air sublines 24, 25 comprise identical lengths and cross sections, then it is sufficient to compare the individually summed-up values SUM_BZ1, SUM_BZ2 with a threshold value SW_ZB1=SW_ZB2, that is valid for both values SUM_BZ1, SUM_BZ2, as illustrated in the diagram according to figure 6. It can be seen from FIG. 6 that the summed-up value SUM_BZ2 of the cylinder bank ZB2 remains significantly below the threshold value SW_ZB1=SW_ZB2, and thereby there is a fault of the secondary valve SLV2 (not opened or not fully opened) and/or a leak or blockage in the secondary air subline 25, whereas the secondary valve SLV1 and the secondary air subline 24 of the first cylinder bank ZB1 are classified as fault-free.

Figure 7:
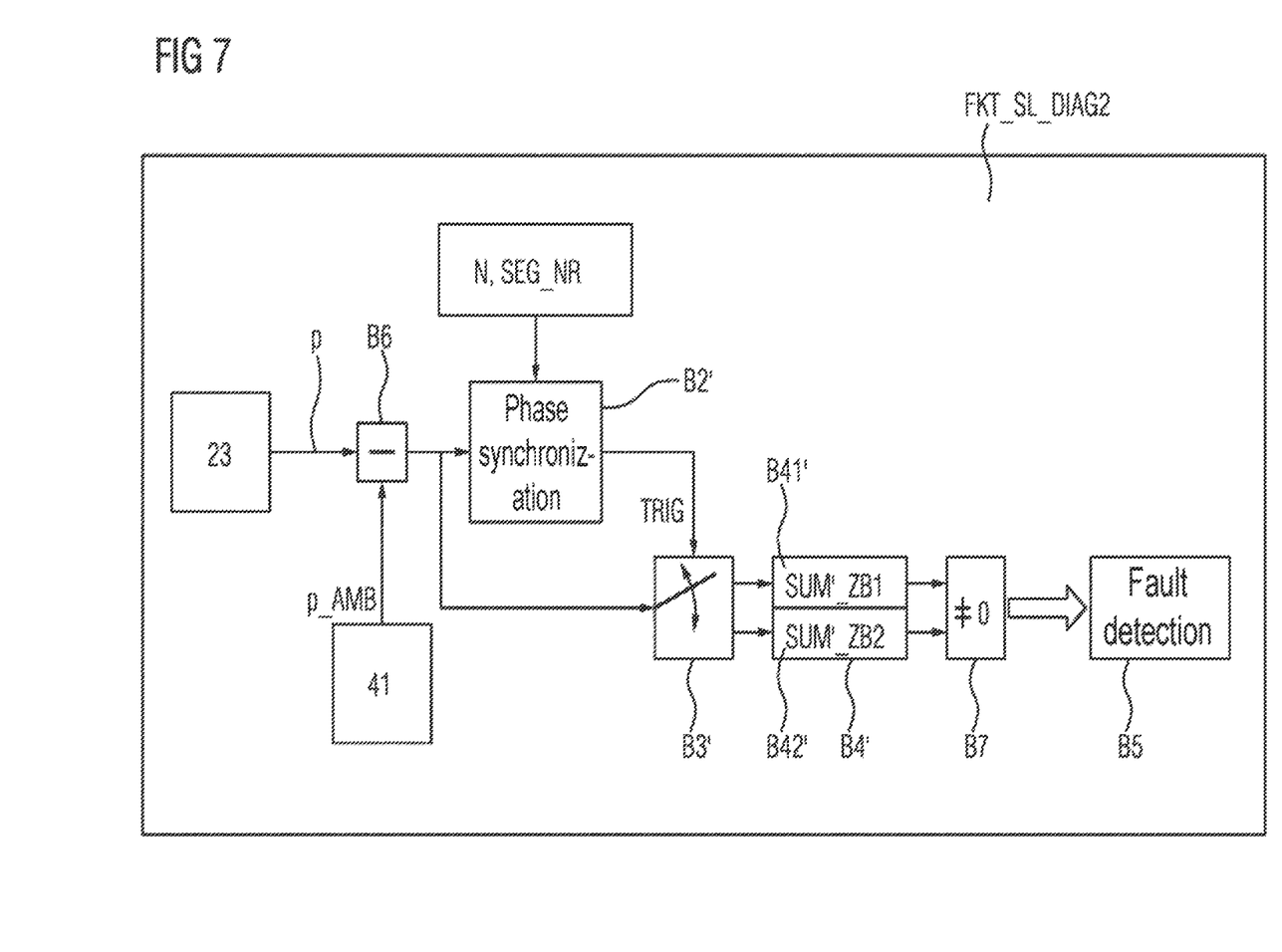
FIG. 7 shows a block diagram of the bank-selective detection of the leak tightness of the secondary air valve.
Figure 8:
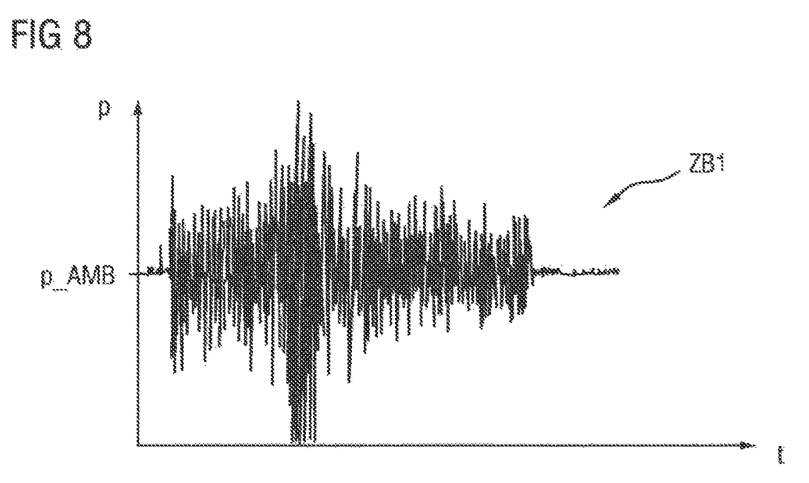
FIG. 8 shows a diagram of the variation with time of the exhaust back pressure determined by the pressure sensor in the event of a hanging open secondary valve and FIG. 9 shows a diagram of the variation with time of summed-up difference values for the two cylinder banks.
Figure 9:
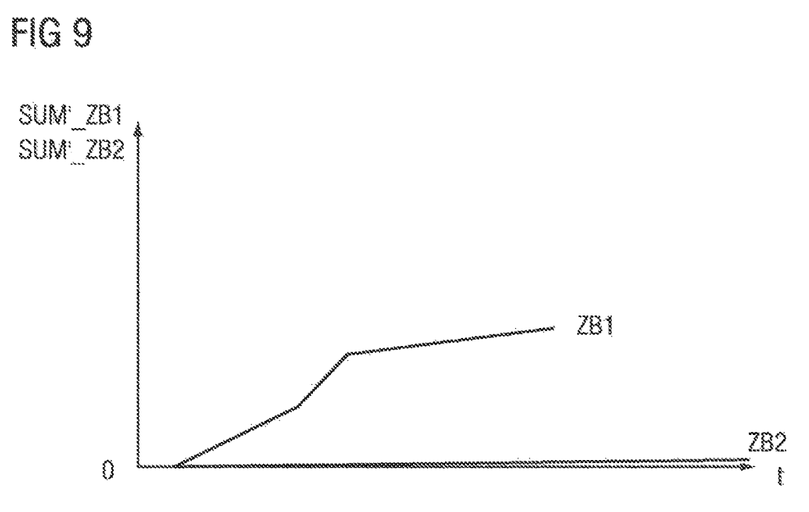

By analysis of the pressure signal p of the pressure sensor 23, besides a leak or blockage in the secondary air sublines 24, 25 or not open or only partly open secondary air valves SLV1, SLV2, in addition secondary air valves SLV1, SLV2 "hanging" (stuck) in the open state are detected, as is now described in detail using FIGS. 7-9. FIG. 7 shows in the form of a block diagram a function FKT_SL_DIAG2 for determining secondary air valves SLV1, SLV2 of the secondary air system 20 that are "hanging in the open state". The term "hanging in the open state" or "stuck in the open state" means in this connection that despite activation of the electric secondary air valve, or when using mechanical non-return valves despite a decrease in pressure to below the opening pressure, said valves do not adopt the closed position thereof, but at least part of the cross section of the secondary air lines 24, 25 remains open.

The function FKT_SL_DIAG2 for determining secondary air valves SLV1, SLV2 "hanging in the open state" is carried out after the function FKT_SL for operating the secondary air system 20 has finished, i.e. after the blowing in of secondary air for the purpose of heating the exhaust catalytic converters 14, 16. The secondary air pump 21 is switched off and the two secondary air valves SLV1, SLV2 are closed. In the case of a properly closing secondary valve SLV1, SLV2, no pressure pulsations should occur.

The signal p of the pressure sensor 23 is, as already mentioned using the description of FIG. 4, sampled at equal intervals and fed to a block B6 that comprises a subtraction point. Because the secondary air pump 21 is switched off, no pulsations from said pump can disturb the pressure signal p, so that filtering of the pressure signal p can be dispensed with here. The ambient pressure (atmospheric pressure) p_AMB that is detected by the ambient air pressure sensor 41 is also fed to the block B6 and the difference is formed from said two values in each case. The value for the pressure difference is fed to a block B2', the function of which corresponds to the function of the block B2 in FIG. 4. A phase synchronization is also carried out, as has already been described using FIG. 4.

Depending on the segment region SEG_NR within which the pressure pulse occurs, the values for the pressure difference are associated either with the cylinder bank ZB1 or the cylinder bank ZB2 using a changeover switch contained in a block B3' controlled by the block B2' by means of a signal TRIG. On the output side, the block B3' is connected to a block B4' containing two bank-specific integrators B41', B42'. Depending on the switch position of the changeover switch in block B3', the individual values for the pressure difference are either fed to the integrator B41' of the first cylinder bank ZB1 or the integrator B42' of the second cylinder bank ZB2, each of which adds up the values for the pressure difference. Following the end of the diagnosis time, the values SUM'_ZB1 and SUM'_ZB2 summed-up by the integrators B41', B42' are examined in a block B7 as to whether the respective sums SUM'_ZB1, SUM'_ZB2 are not equal to zero. If this is the case, in a following fault detection block B5' the respective secondary valve SLV1, SLV2 is detected to be "hanging open".

In FIG. 8 the time profile of the pressure p is shown for the case in which the secondary valve SLV1 associated with the first cylinder bank ZB1 has not closed properly after the deactivation of the secondary air system 20. Pressure oscillations occur in the positive and negative directions about the value of the ambient pressure p_AMB. The pressure fluctuations occurring as a result of the combustion processes in the combustion chambers of the cylinders Z1-Z6 pass through the open secondary air valve SLV1 to the pressure sensor 23.

FIG. 9 shows the variation with time of the two summed-up difference values SUM'_B1, SUM'_ZB2. As already mentioned above, the summed-up difference value SUM'_ZB1 is not equal to zero and thus there is a defect of the secondary air valve SLV1 of the cylinder bank ZB1 in the secondary air subline 24, whereas the summed-up difference value SUM'_ZB2 is equal to zero, from which a properly closing secondary valve SLV2 is detected in the secondary air subline 25 of the second cylinder bank ZB2.

LIST OF TERMINOLOGY/REFERENCE SIGNS

10 Internal combustion engine
11 Primary air system
12 Exhaust duct of first cylinder bank
13 Exhaust duct of second cylinder bank
14, 16 Exhaust catalytic converter
15, 17 Exhaust gas sensor; lambda probe
20 Secondary air system
21 Compression means, secondary air pump
22 Common secondary air line
23 Pressure sensor
24, 25 Bank-selective secondary air sublines
26 Branching point
30 Electronic control unit, ECU
31 Computing unit (processor)
32 Program memory
33 Value memory (data memory)
34 Fault memory
40 Fault display device
41 Ambient air pressure sensor
42 Revolution rate sensor
43 Crankshaft angle sensor
44 Coolant temperature sensor
45 Air flow meter
46 Battery
B1 Filter block
B11 Bandpass filter
B2, B2' Phase synchronization block
B3, B3' Changeover block
B4, B4' Integrator block
B41, B42 Bank-specific integrators
B41', B42' Bank-specific integrators
B5, B5' Fault detection block
B6 Subtractor block
B7 Comparison block
FKT_SL Function for operating the secondary air system
FKT_SL_DIAG1 First function for diagnosing the secondary air system
FKT_SL_DIAG2 Second function for diagnosing the secondary air system
KW Crankshaft angle
MAF Cylinder fill level
N Revolution rate
p Exhaust back pressure
p_AMB Ambient air pressure
SLV1 Secondary air valve of first cylinder bank ZB1
SLV2 Secondary air valve of second cylinder bank ZB2
TCO Coolant temperature
TRIG Trigger
t Time
Δt Time delay
t0-t3 Points in time
VB Battery voltage
ZA Ignition spacing
Z1-Z6 Cylinders
ZB1 First cylinder bank
ZB2 Second cylinder bank
SUM_ZB1, SUM_ZB2 Summed pressure pulses
SUM'_ZB1, SUM'_ZB2 Summed pressure difference values
SEG_NR Segment region
SW_ZB1, SW_ZB2 Threshold value

What is claimed is:

1. A method for operating a multi-cylinder internal combustion engine, the method comprising:
monitoring a pressure in a secondary air system with which secondary air is introduced into exhaust of the internal combustion engine wherein individual cylinders of the internal combustion engine are associated with one of at least two cylinder banks and a separate exhaust duct is associated with each cylinder bank;
delivering secondary air to the at least two cylinder banks using a compression arrangement via a common secondary air line divided into a number of individual secondary air sublines corresponding to the number of exhaust ducts at a branching point downstream of the compression arrangement;
controlling flow of the secondary air to enable or inhibit the flow using a throughflow control arrangement in each of the individual secondary air sublines;
detecting values for the pressure using a pressure sensor downstream of the compression arrangement and upstream of the branching point;
detecting pressure pulsations of a pressure in each cylinder bank when the compression arrangement is activated and the throughflow control arrangement set into the open state;
summing the detected pressure pulsations;
comparing each the cylinder bank-specific summed-up values with threshold values; and
if the respective threshold value is exceeded, identifying a fault in the throughflow control arrangement, the fault comprising an arrangement that is not opened or not fully opened, or a blockage, or a leak in the corresponding secondary air subline and adjusting operation of the internal combustion engine using a cylinder bank-specific entry in a fault memory of a control device corresponding to the identified fault.

2. The method as claimed in claim 1, further comprising filtering the pressure signal with a bandpass filter before summing the cylinder bank-specific pressure pulsations.

3. The method as claimed in claim 2, wherein the bandpass filter comprises an adaptive bandpass filter with cut-off frequencies dependent on a revolution rate and a battery voltage associated with an on-board electrical system of the internal combustion engine.

4. The method as claimed in claim 2, wherein the bandpass filter includes fixed cut-off frequencies determined experimentally and stored in a value memory of a control device controlling the internal combustion engine.

5. The method as claimed in claim 1, further comprising the threshold values stored in a characteristic field of a value memory of a control device controlling the internal combustion engine as a function of a cylinder fill level summed-up during the blowing in of secondary air and a coolant temperature of the internal combustion engine.

6. The method as claimed in claim 5, wherein the threshold values comprise identical values for equal geometric lengths of the secondary air sublines.

7. The method as claimed in claim 1, wherein the throughflow control arrangement comprises electrically controlled valves that are closed in the deenergized state.

8. The method as claimed in claim 1, wherein the throughflow control arrangements comprise mechanical non-return valves.

9. The method as claimed in claim 1, further comprising, in the event of a detected malfunction of a component of the secondary air system, entering a cylinder bank-specific entry in a fault memory of a control device controlling the internal combustion engine.

10. The method as claimed in claim 1, wherein the compression arrangement comprises an electrically driven secondary air pump.

11. A method for monitoring a secondary air system of a multi-cylinder internal combustion engine, with which secondary air is introduced into the exhaust gas of the internal combustion engine, wherein individual cylinders of the internal combustion engine are associated with one of at least two cylinder banks and a separate exhaust duct is associated with each cylinder bank, the method comprising:
  delivering secondary air each cylinder bank using a compression arrangement via a common secondary air line dividing into a number of individual secondary air sublines corresponding to the number of exhaust ducts at a branching point downstream of the compression arrangement;
  enabling or inhibiting the flow of the secondary air using a throughflow control arrangement in each of the individual secondary air sublines;
  detecting values of a pressure by means of a pressure sensor downstream of the compression arrangement and upstream of the branching point;
  identifying pressure pulsations of the pressure cylinder bank occurring with the compression arrangement turned off and the throughflow control arrangement set into the closed state;
  detecting values for the ambient pressure;
  calculating a pressure difference between the individual pulses of the pressure and the values for the ambient pressure cylinder bank-specifically;
  summing the cylinder bank-specific pressure differences and checking whether the respective sums are not equal to zero; and
  if said sums are different from zero, generating a stuck open secondary valve fault; and
  adjusting operation of the internal combustion engine using a cylinder bank-specific entry in a fault memory of a control device corresponding to the identified fault.

12. The method as claimed in claim 11, wherein the throughflow control arrangement comprises electrically controlled valves that are closed in the deenergized state.

13. The method as claimed in claim 11, wherein the throughflow control arrangements comprise mechanical non-return valves.

14. The method as claimed in claim 11, further comprising, in the event of a detected malfunction of a component of the secondary air system, entering a cylinder bank-specific entry in a fault memory of a control device controlling the internal combustion engine.

15. The method as claimed in claim 11, wherein the compression arrangement comprises an electrically driven secondary air pump.

\* \* \* \* \*